US009770706B2

(12) United States Patent
Kartick et al.

(10) Patent No.: US 9,770,706 B2
(45) Date of Patent: Sep. 26, 2017

(54) CATALYST COMPOSITION FOR THE PRODUCTION OF SYNGAS FROM METHANE, PROCESS THEREFORE AND PROCESS FOR $CO_2$ REFORMING THEREWITH

(71) Applicant: SAUDI BASIC INDUSTRIES CORPORATION, Riyadh (SA)

(72) Inventors: Chandra Mondal Kartick, Vadodara (IN); Mayank Harishbhai Vyas, Vadodara (IN); Sankar Sasmal, West Bengal (IN)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/891,212

(22) PCT Filed: Jun. 5, 2014

(86) PCT No.: PCT/IB2014/061993
§ 371 (c)(1),
(2) Date: Nov. 13, 2015

(87) PCT Pub. No.: WO2014/195904
PCT Pub. Date: Dec. 11, 2014

(65) Prior Publication Data
US 2016/0121305 A1 May 5, 2016

Related U.S. Application Data

(60) Provisional application No. 61/896,902, filed on Oct. 29, 2013.

(30) Foreign Application Priority Data

Jun. 6, 2013 (EP) .................................. 13170906

(51) Int. Cl.
C01B 3/40 (2006.01)
B01J 21/04 (2006.01)
(Continued)

(52) U.S. Cl.
CPC ............... *B01J 23/78* (2013.01); *B01J 35/10* (2013.01); *B01J 35/1038* (2013.01);
(Continued)

(58) Field of Classification Search
CPC . B01J 21/04; B01J 21/06; B01J 21/063; B01J 21/066; B01J 21/08; B01J 21/10;
(Continued)

(56) References Cited

U.S. PATENT DOCUMENTS 3,408,171 A * 10/1968 Pupko .................... B01J 23/755
48/198.7
3,533,963 A * 10/1970 Gignier .................. B01J 23/755
48/214 A
(Continued)

FOREIGN PATENT DOCUMENTS

EP 2810709 A1 12/2014

OTHER PUBLICATIONS

Choudhary, Vasant R., "High-temperature stable and highly active/selective supported NiCoMgCeOx catalyst suitable for autothermal reforming of methane to syngas", Journal of Catalysis 233 (2005) 36-40.
(Continued)

Primary Examiner — Cam N. Nguyen
(74) Attorney, Agent, or Firm — Cantor Colburn LLP

(57) ABSTRACT

A catalyst for performing carbon dioxide reforming of methane to produce syngas, that includes cobalt, nickel and magnesium oxides disposed a support.

24 Claims, 4 Drawing Sheets

(51) Int. Cl.
*B01J 21/06* (2006.01)
*B01J 21/08* (2006.01)
*B01J 21/10* (2006.01)
*B01J 21/12* (2006.01)
*B01J 21/14* (2006.01)
*B01J 23/02* (2006.01)
*B01J 23/10* (2006.01)
*B01J 23/75* (2006.01)
*B01J 23/755* (2006.01)
*B01J 23/78* (2006.01)
*B01J 23/83* (2006.01)
*B01J 23/835* (2006.01)
*B01J 23/847* (2006.01)
*B01J 35/10* (2006.01)
*B01J 37/00* (2006.01)
*B01J 37/02* (2006.01)
*B01J 37/08* (2006.01)

(52) U.S. Cl.
CPC ....... *B01J 35/1061* (2013.01); *B01J 37/0036* (2013.01); *B01J 37/0201* (2013.01); *B01J 37/0236* (2013.01); *B01J 37/08* (2013.01); *C01B 3/40* (2013.01); *C01B 2203/0238* (2013.01); *C01B 2203/1052* (2013.01); *C01B 2203/1058* (2013.01); *C01B 2203/1082* (2013.01); *C01B 2203/1094* (2013.01); *C01B 2203/1241* (2013.01); *Y02P 20/52* (2015.11)

(58) Field of Classification Search
CPC ... B01J 21/12; B01J 21/14; B01J 23/02; B01J 23/10; B01J 23/75; B01J 23/755; B01J 23/78; B01J 23/83; B01J 23/835; B01J 23/8474; B01J 23/8476; B01J 35/10; B01J 35/1038; B01J 35/1061; B01J 37/0036; B01J 37/0201; B01J 37/0236; B01J 37/08; C01B 3/40
USPC ....... 502/252, 258–260, 263, 304, 327, 328, 502/332, 335, 337, 340, 341, 349–355, 502/439
See application file for complete search history.

(56) References Cited

U.S. PATENT DOCUMENTS

| 5,744,419 | A | 4/1998 | Choudhary et al. | |
|---|---|---|---|---|
| 6,635,191 | B2 * | 10/2003 | Figueroa | B01J 23/002 |
| | | | | 252/373 |
| 6,680,006 | B2 | 1/2004 | Chantal | |
| 7,432,222 | B2 | 10/2008 | Choudhary et al. | |
| 8,067,332 | B2 * | 11/2011 | Lee | B01J 23/75 |
| | | | | 429/400 |
| 8,143,186 | B2 * | 3/2012 | Rytter | B01J 23/755 |
| | | | | 502/259 |
| 8,765,085 | B2 * | 7/2014 | Tran | B01D 53/945 |
| | | | | 423/213.2 |
| 8,932,774 | B2 * | 1/2015 | Melo Faus | B01J 21/10 |
| | | | | 423/654 |
| 9,034,786 | B2 * | 5/2015 | Kumar | B01J 37/031 |
| | | | | 502/327 |
| 9,498,769 | B2 * | 11/2016 | Son | B01J 23/78 |
| 2009/0314993 | A1 | 12/2009 | Zhang et al. | |
| 2012/0027670 | A1 * | 2/2012 | Zhou | B01J 23/002 |
| | | | | 423/651 |
| 2012/0028794 | A1 * | 2/2012 | Lam | B01J 23/50 |
| | | | | 502/303 |
| 2012/0184430 | A1 | 7/2012 | Lee et al. | |
| 2013/0012606 | A1 * | 1/2013 | Rytter | B01J 21/04 |
| | | | | 518/717 |
| 2013/0165703 | A1 * | 6/2013 | Weiner | C07C 29/149 |
| | | | | 568/885 |
| 2015/0307352 | A1 * | 10/2015 | Kumar | B01J 37/031 |
| | | | | 252/373 |

OTHER PUBLICATIONS

European Search Report mailed Nov. 13, 2013, 8 pages.
Fan, Mun-Sing, et al., "Utilization of greenhouse gases through carbon dioxide reforming of methane over Ni—Co/MgO—ZrO2: Preparation, characterization and activity studies", Applied Catalysis B: Enviornmental 100 (2011) 365-377.
International Search Report of the International Searching Authority for PCT/IB2014/061993 mailed Sep. 10, 2014, 5 pages.
Newnham, Jarrod, et al., "Highly stabel and active Ni-mesoporous alumina catalysts for dry reforming of methane", Journal of Hydrogen Energy 37 (2012) 1454-1464.
Sarkar, Bipul, et al., "Reforming of methane with CO2 over Ni nanoparticle supported on mesoporous ZSM-5", Catalysis Today 198 (2012) 209-214.
Shen, Weihau, et al., "Marked role of mesopores for the prevention of sintering and carbon deposition in dry reforming of methane over ordered mesoporous Ni—Mg—Al oxides", Catalysis Today 171 (2011) p. 150-155.
Written Opinion of the International Searching Authority for PCT/IB2014/061993 mailed Sep. 10, 2014, 7 pages.
Xu, Leilei, et al., "Carbon dioxide reforming of methane over ordered mesoporous NiO—MgO—Al2O3 composite oxides", Applied Catalysis B: Environmental 108-109 (2011) p. 177-190.

* cited by examiner

CATALYST COMPOSITION FOR THE PRODUCTION OF SYNGAS FROM METHANE, PROCESS THEREFORE AND PROCESS FOR $CO_2$ REFORMING THEREWITH

This application is a national stage application of PCT/IB2014/061993, filed Jun. 5, 2014, which claims priority to U.S. Provisional Application Ser. No. 61/896,902 filed Oct. 29, 2013, and to EP13170906.5 filed Jun. 6, 2013, which are hereby incorporated by reference in their entirety.

BACKGROUND

Improved catalyst compositions for the use in carbon dioxide reforming of methane to generate syngas are described herein.

Conversion of carbon dioxide and methane, two of the leading greenhouse gases, into useful chemical materials has gained interest. In particular, methods of converting carbon dioxide and methane into syngas, also known as synthesis gas, have been studied in chemical factories and oil refineries where a relatively large amount of carbon dioxide is generated. Syngas, which is primarily composed of hydrogen and carbon monoxide, can be used as feedstock for the production of higher hydrocarbons, such as fuels, or to produce chemical reaction intermediates, such as methanol.

Syngas can be produced from methane via either steam reforming or dry reforming. Dry reforming of methane, which uses both carbon dioxide and methane as reactants in the presence of a catalyst, is of interest because it produces syngas with a hydrogen-to-carbon monoxide ratio close to 1.0, which is desirable as a feedstock for the production of higher hydrocarbons. Catalysts for converting methane and carbon dioxide into syngas are known in the art. For example, U.S. Patent Application No. 2012/0184430 and Sakar et al., Catalysis Today, Vol. 198:1 (2012), disclose a catalyst for the carbon dioxide reforming of methane. U.S. Pat. Nos. 5,744,419, 6,680,006 and 7,432,222 disclose catalyst compositions for the conversion of methane into syngas.

The dry reforming process can lead to extensive carbon formation on the catalyst during reaction, leading to catalyst deactivation and reduced efficiency. Moreover, the water gas shift reaction (WGS), which occurs simultaneously with the dry reforming reaction, can result in the syngas having a lower hydrogen-to-carbon monoxide ratio.

Thus, there remains a need in the art for a catalyst that efficiently catalyzes the carbon dioxide reforming of methane to form syngas with a hydrogen-to-carbon monoxide ratio close to 1.0 and is resistant to deactivation from carbon accumulation.

SUMMARY

Described herein is a $CO_2$ reforming supported catalyst, comprising oxides of cobalt, nickel, and magnesium disposed on a support comprising alumina, ceria, niobia, silica, tantalum oxide, tin oxide, titania, or a combination comprising at least one of the foregoing oxides.

Further described herein is a $CO_2$ reforming supported catalyst, comprising oxides of cobalt, nickel, and magnesium disposed on a support, wherein the amount of magnesium is between 0.05 and 2.5 mol % relative to the supported catalyst.

Additionally described herein is a $CO_2$ reforming supported catalyst, comprising a mixed metal oxide catalyst component of the formula $NiCoMgO_x$ disposed on a support.

Also described is a process for the preparation of a $CO_2$ reforming supported catalyst, the process comprising combining a templating copolymer and a support precursor in a solvent to form a support solution, wherein the support precursor comprises an aluminum compound, cerium compound, niobium compound, silicon compound, tantalum compound, titanium compound, or a combination comprising at least one of the foregoing salts; dissolving a magnesium salt, a cobalt salt, and a nickel salt in a solvent to form a the metal solution; combining the support solution and the metal solution; adding an acid to form a catalyst solution; heating the catalyst solution at a temperature effective to form a solid catalyst mass; grinding the solid catalyst mass into a powdered catalyst; and calcining the powdered catalyst in the presence of oxygen to provide the $CO_2$ reforming supported catalyst.

Furthermore described herein is a process for the preparation of any of the $CO_2$ reforming supported catalyst described above, the process comprising providing a support comprising alumina, ceria, niobia, silica, tantalum oxide, tin oxide, titania, zirconia, or a combination comprising at least one of the foregoing oxides; impregnating the support with a solution comprising salts of nickel, cobalt and magnesium; drying the impregnated support; and calcining the impregnated, dried support at a temperature above 500° C.

Moreover described herein is a process for $CO_2$ reforming of lower alkanes to synthesis gas, comprising subjecting a feedstream of gaseous lower alkanes to $CO_2$ the $CO_2$ reforming supported catalyst.

DETAILED DESCRIPTION

Figure 1:
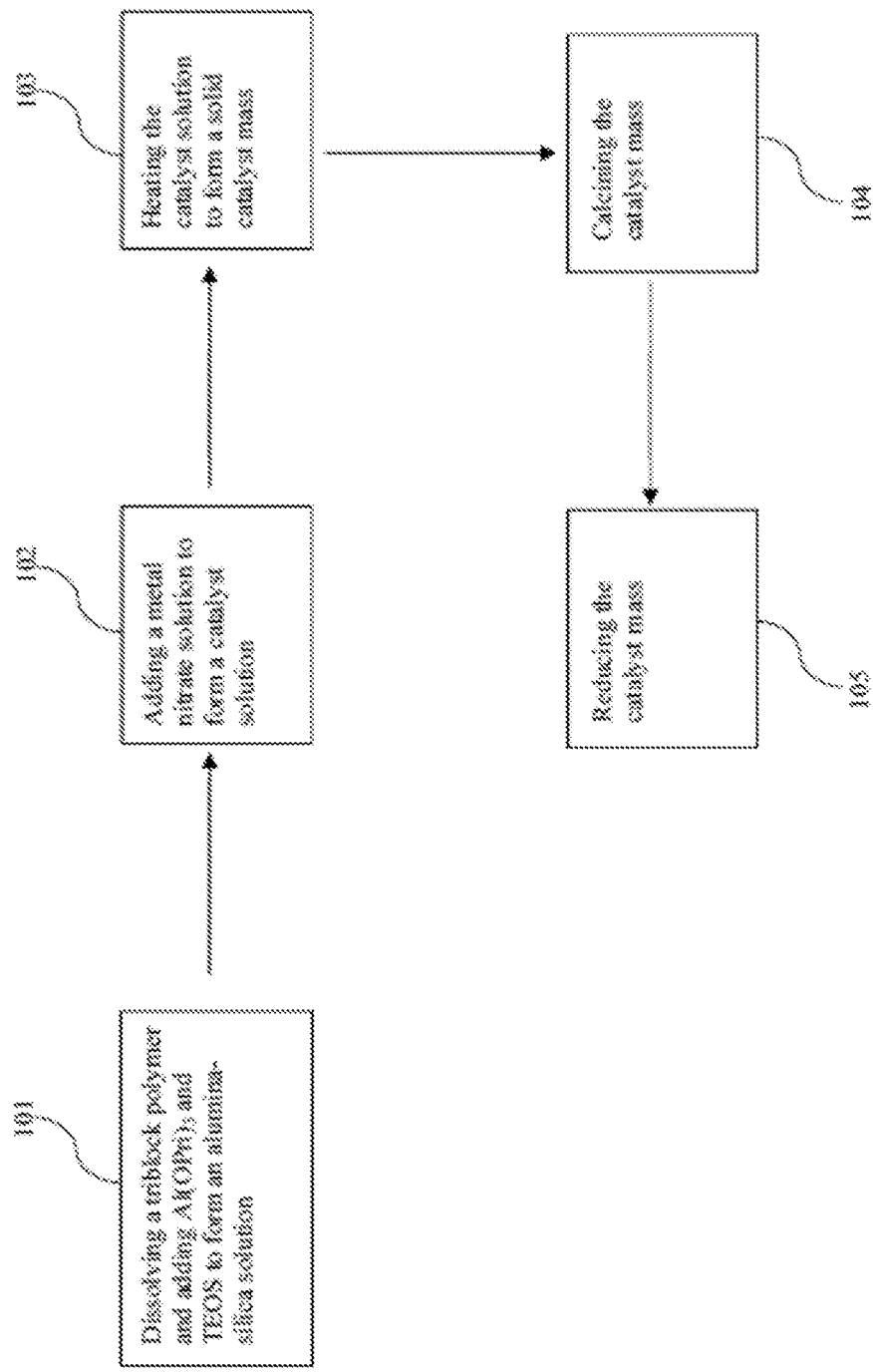
FIG. 1 shows a method for generating a $CO_2$ reforming supported catalyst in accordance with one non-limiting exemplary embodiment of the disclosed subject matter.

The present disclosure relates to improved catalyst compositions for use in the production of syngas. In particular, the present disclosure provides for a $CO_2$ reforming supported catalyst having a porous support and a multi-component metal catalyst. The present disclosure further provides for processes for manufacturing the $CO_2$ reforming supported catalyst, and using the $CO_2$ reforming supported catalyst for carbon dioxide reforming of methane to generate syngas.

Carbon dioxide reforming of methane to produce syngas can be an effective way to use two of the leading greenhouse gases to produce syngas, a valuable feedstock in the generation of higher hydrocarbons. Syngas, or synthesis gas, is a gaseous mixture consisting primarily of hydrogen and carbon monoxide, although it can also contain other gas components, such as carbon dioxide and nitrogen.

Syngas, produced by the reforming process, can be directly used as a feedstock for further chemical processes including, but not limited to, Fischer-Tropsch (F-T) synthesis or carbonylation reactions like alkene hydrocarbonylation or aromatic hydrocarbon hydrocarbonylation to produce aromatic aldehydes. For example, syngas can be used to produce diesel fuel, or converted into methanol or dimethyl ether.

The catalyst compositions, i.e., the $CO_2$ reforming supported catalysts disclosed herein can be used for the carbon dioxide reforming of methane to form syngas, and exhibit high hydrocarbon conversion and high carbon monoxide and hydrogen selectivities over extended periods of time. Further, the $CO_2$ reforming supported catalysts exhibit resistance to carbon accumulation resulting in long term activity.

The $CO_2$ reforming supported catalyst includes a catalyst metal component, preferably a metal oxide, and a porous support material. In some embodiments, the catalyst metal component can include more than one metal. For example, the catalyst metal component can include at least one metal selected from nickel, magnesium, cobalt, gold, strontium, palladium, platinum, ruthenium, rhodium, osmium, iridium, silver, copper, iron, chromium, lead, vanadium, tungsten, or a combination comprising at least one of the foregoing. Exemplary metal oxides include oxides of nickel, magnesium, cobalt, gold, strontium, palladium, platinum, ruthenium, rhodium, osmium, iridium, silver, copper, iron, chromium, lead, vanadium, tungsten, or a combination comprising at least one of the foregoing. Preferably, the metal oxides are oxides of cobalt, nickel, and magnesium.

In some embodiments, the metal catalyst component can contain at least one Group X metal, at least one Group IX metal, at least one alkaline earth metal or a combination comprising at least one of the foregoing. In a preferred embodiment, the catalyst metal component contains nickel, cobalt, and magnesium. Nickel-based catalysts are prone to the accumulation of carbon, which ultimately leads to deactivation and reduced efficiency of the catalyst. Without being bound by theory, the presence of cobalt in a nickel-based catalyst helps suppress carbon accumulation and prevents catalyst deactivation. Further without being bound by theory, magnesium in the catalyst composition protects the active metals, such as nickel and cobalt, from sintering during the high temperature reaction and prevents the active metals from reacting with the components of the porous support.

The amount of each metal present in with the metal catalyst component can vary depending on the reaction conditions under which the $CO_2$ reforming supported catalyst is intended to operate. In some embodiments, the Group IX metal, i.e., cobalt, can be present at a mole percentage from 10 to 30%, from 10 to 25%, from 15 to 25%, from 20 to 25%, or from 22 to 33%. In some embodiments, the Group X metal, i.e., nickel, can be present at a mole percentage from 10 to 30%, from 10 to 25%, from 15 to 25%, from 20 to 25%, or from 22 to 33%. In some embodiments, the alkaline earth metal, i.e., magnesium, can be present at a mole percentage from 30 to 60%, from 30 to 55%, from 30 to 50%, from 35 to 50%, from 40 to 50%, from 40 to 50%, or from 44 to 56%. In some embodiments, the metal catalyst component can include nickel at a mole percentage of 20 to 25%, cobalt at a mole percentage of 20 to 25% and magnesium at a mole percentage of 45 to 50%. In some embodiments, the metal catalyst component can include a mole ratio of nickel:cobalt:magnesium of 0.9-1.1:0.9-1.1:1.8-2.2, preferably a mole ratio of nickel:cobalt:magnesium of 1:1:2.

In an embodiment, the metal catalyst component comprises a mixed metal oxide catalyst component of the formula $NiCoMgO_x$. In an embodiment, the mixed metal oxide catalyst component is of the formula $Ni_aCo_bMg_cO_x$ wherein a, b, c, and x are the molar ratios of each element as described herein, and the porous support material can be any support material known and used in the art. Non-limiting examples of support materials include, but are not limited to, silica, alumina, ceria, niobia, titania, tantalum oxide, tin oxide, zirconia, or a combination comprising at least one of the foregoing. In an embodiment, no zirconia is present. In a preferred embodiment, the support is an alumina support, silica support, or alumina-silica support, and in an especially preferred embodiment, the support is an alumina support, silica support, or alumina-silica support that may comprise small amounts of other components (e.g., ceria, niobia, tantalum oxide or tin oxide), but do not comprise zirconia. Mesoporous supports are especially preferred.

In another embodiment, the catalyst component comprises nickel, cobalt, and magnesium oxides, wherein the porous support material can be any support material known and used in the art, provided that no zirconia is present. Non-limiting examples of support materials include, but are not limited to, silica, alumina, ceria, niobia, titania, tantalum oxide, tin oxide, or a combination comprising at least one of the foregoing, provided that zirconia is not present. In a preferred embodiment, the support is an alumina support, silica support, or alumina-silica support, and in an especially preferred embodiment, the support is an alumina support, silica support, or alumina-silica support that may comprise small amounts of other components (e.g., ceria, niobia, tantalum oxide or tin oxide), but do not comprise zirconia. The porous support material can be any support material known and used in the art. Non-limiting examples of support materials include, but are not limited to, silica, alumina, ceria, niobia, titania, tantalum oxide, tin oxide, zirconia, or a combination comprising at least one of the foregoing. In an embodiment, no zirconia is present. In a preferred embodiment, the support is an alumina support, silica support, or alumina-silica support, and in an especially preferred embodiment, the support is an alumina support, silica support, or alumina-silica support that may comprise small amounts of other components (e.g., ceria, niobia, tantalum oxide or tin oxide), but do not comprise zirconia. Mesoporous supports are especially preferred.

In still other embodiments, the catalyst component comprises oxides of cobalt, nickel, and magnesium, wherein the amount of magnesium in the supported catalyst is 0.05 to 2.5 mol % relative to the supported catalyst. In another specific embodiment, the metal catalyst component comprises a mixed metal oxide catalyst component of the formula $NiCoMgO_x$, or of the formula $Ni_aCo_bMg_cO_x$ wherein a, b, c, and x are the molar ratios of each element as described herein, wherein the amount of magnesium in the supported catalyst is 0.05 to 2.5 mol % relative to the supported catalyst. In either of the foregoing embodiment, the amount of magnesium is greater than or equal to 0.1 mol %, more preferably greater than or equal to 0.3 mol %. The amount of magnesium in the supported catalyst can be less than or equal to 2.0 mol % relative to the supported catalyst, or less than or equal to 1.5 mol % and more preferably less than or equal to 1.2 mol %. In any of these embodiments, the porous support material can be any support material known and used in the art. Non-limiting examples of support materials include, but are not limited to, silica, alumina, ceria, niobia, titania, tantalum oxide, tin oxide, zirconia, or a combination comprising at least one of the foregoing. In an embodiment, no zirconia is present. In a preferred embodiment, the support is an alumina support, silica support, or alumina-silica support, and in an especially preferred embodiment, the support is an alumina support, silica support, or alumina-silica support that may comprise small amounts of other components (e.g., ceria, niobia, tantalum oxide or tin oxide), but do not comprise zirconia. Mesoporous supports are especially preferred.

Most preferably in any of the foregoing embodiments, the support material includes silica-alumina; or silica-alumina and no zirconia. The amount of alumina and silica in the support material can vary. For example, the alumina-silica support can include alumina at a mole percentage of 90 to 100% or 95 to 100%. In addition, or alternatively, the alumina-silica support can include silica at a mole percentage of 1 to 10% or 1 to 5%. In some embodiments, the alumina-silica support contains alumina at a mole percentage of 93 to 97%, specifically 95%, and contains silica at a mole percentage of 3 to 7%, specifically 5%. In some embodiments, the alumina-silica support has an alumina:silica mole ratio of 1.0:0.1 to 1.1:1.0, or of 1.0:0.3 to 1.0:0.7, specifically an alumina:silica mole ratio of 1:0.05.

In some embodiments, the alumina-silica porous support has an SBA-15, FSM-16 or MCM-41 structure. For example, the alumina-silica support can have a SBA-15-like structure. In some embodiments, the porous support, in particular the alumina-silica support, contains pores within the mesoporous range. For example, the porous support material has an average pore diameter from 2 nm to 10 nm, from 2 nm to 20 nm, from 2 nm to 30 nm, 2 nm to 40 nm or from 2 nm to 50 nm. In some embodiments, the support has an average pore size from 2 nm to 20 nm. In some embodiments, the pore has an average pore diameter from 5 nm to 13 nm. In some embodiments, the porous support has an average pore volume from 0.06 cm$^3$/g to 0.5 cm$^3$/g. For example, the porous support material can have an average pore volume from 0.07 cm$^3$/g to 0.5 cm$^3$/g, from 0.08 cm$^3$/g to 0.5 cm$^3$/g, from 0.09 cm$^3$/g to 0.5 cm$^3$/g, from 0.1 cm$^3$/g to 0.5 cm$^3$/g, from 0.2 cm$^3$/g to 0.5 cm$^3$/g, from 0.3 cm$^3$/g to 0.5 cm$^3$/g, from 0.4 cm$^3$/g to 0.5 cm$^3$/g, from 0.06 cm$^3$/g to 0.4 cm$^3$/g, from 0.06 cm$^3$/g to 0.3 cm$^3$/g, from 0.06 cm$^3$/g to 0.2 cm$^3$/g, from 0.06 cm$^3$/g to 0.1 cm$^3$/g, from 0.06 cm$^3$/g to 0.09 cm$^3$/g, from 0.06 cm$^3$/g to 0.08 cm$^3$/g or from 0.06 cm$^3$/g to 0.07 cm$^3$/g. In some embodiments, the average pore diameter and pore volume of the porous support is determined by the Barrett-Joyner-Halenda (BJH) analysis method using desorption techniques.

The porous support of the $CO_2$ reforming supported catalyst has a large surface area, which results in increased dispersion of the metal catalyst component within the porous support and increases thermal stability of the $CO_2$ reforming supported catalyst. Furthermore, the large surface area results in a reduction in the deactivation of the catalysts due to sintering and migration of the metal catalyst component. In some embodiments, the porous support can have a surface area in the range of 100 m$^2$/g to 150 m$^2$/g, of 100 m$^2$/g to 140 m$^2$/g, of 100 m$^2$/g to 130 m$^2$/g, of 100 m$^2$/g to 120 m$^2$/g or of 100 m$^2$/g to 110 m$^2$/g. In some embodiments, the porous support can have a surface area in the range of 100 m$^2$/g to 110 m$^2$/g. For example, the surface area of the porous support can be 107 m$^2$/g.

In some embodiments, the $CO_2$ reforming supported catalyst can further include one or more promoters. Non-limiting examples of suitable promoters include lanthanides, alkaline earth metals, or a combination comprising at least one of the foregoing. In some embodiments, promoters can comprise from 1 wt % to 50 wt %, from 1 wt % to 40 wt %, from 1 wt % to 30 wt %, from 1 wt % to 20 wt % or from 1 wt % to 10 wt % of the $CO_2$ reforming supported catalyst.

The catalysts provide high hydrocarbon and carbon dioxide conversion percentages. In some embodiments, the $CO_2$ reforming supported catalyst can result in a hydrocarbon conversion equal to or greater than 80%, equal to or greater than 85%, equal to or greater than 90%, equal to or greater than 95%, or equal to or greater than 96%. For example, the $CO_2$ reforming supported catalyst can result in equal to or greater than 96% hydrocarbon, i.e., methane, conversion. In some embodiments, $CO_2$ reforming supported catalyst can result in carbon dioxide conversion of equal to or greater than 80%, equal to or greater than 85%, equal to or greater than 90% or equal to or greater than 91%. For example, the $CO_2$ reforming supported catalyst can result in equal to or greater than 91% carbon dioxide conversion.

The $CO_2$ reforming supported catalysts exhibit high hydrogen selectivity to produce syngas that contains hydrogen to carbon monoxide ratios that approach 1.0. In some embodiments, the presence of silica within the alumina network suppresses the water gas shift reaction to prevent decreases in the hydrogen-to-carbon ratio of the generated syngas. In some embodiments, $CO_2$ reforming supported catalysts exhibit hydrogen selectivity equal to or greater than 80%, equal to or greater than 85%, equal to or greater than 90%, equal to or greater than 95%, equal to or greater than 96% or equal to or greater than 97%. For example, the $CO_2$ reforming supported catalyst exhibits hydrogen selectivity equal to or greater than 97%.

The present disclosure also provides for a method for generating the $CO_2$ reforming supported catalysts. The catalysts can be prepared by any catalyst synthesis process well known in the art. See, for example, U.S. Pat. Nos. 6,299,995 and 6,293,979. Additional examples include, but are not limited to, spray drying, precipitation, impregnation, incipient wetness, ion exchange, fluid bed coating, physical, or chemical vapor deposition. In some embodiments, the method for generating the disclosed catalyst results in the incorporation of silica into an alumina network to form an alumina-silica support.

In some embodiments, the process for the preparation of the $CO_2$ reforming supported catalyst includes dissolving a templating agent in a solvent, for example a C1-6 alcohol such as ethanol, and subsequently adding a support material precursor compound, such as an aluminum C1-8 alkoxide of the metal (e.g., aluminium isopropoxide (Al(OPri)$_3$)), or a C1-8 alkyl orthosilicate of the metal (e.g., tetraethyl orthosilicate), to form a support solution 101, as shown in FIG. 1. In some embodiments, the organic templating agent can be a glycol, a compound that includes two or more hydroxyl groups, such as glycerol, diethylene glycol, triethylene glycol, tetraethylene glycol, and propylene glycol. Additional non-limiting examples of organic templating agents include triethanolamine, sulfolane, tetraethylene pentamine, and diethylglycol dibenzoate. In some embodiments, the organic templating agent is a triblock copolymer. One non-limiting example of a triblock copolymer is a poly(ethylene glycol)-poly(propylene glycol)-poly(ethylene glycol) copolymer available under the trade name PLURONIC® P123, manufactured by BASF Corp.

The process further includes adding a catalyst metal precursor solution, containing one or more metals, to the support solution, followed by addition of a strong acid, e.g., concentrated nitric acid to form a metal catalyst solution 102. The catalyst precursor solution can be aqueous or non-aqueous solutions. Non-limiting examples of non-aqueous solvents can include polar solvents, aprotic solvents, alcohols, and crown ethers, such as, tetrahydrofuran and ethanol. In some embodiments, the metal catalyst precursor solution is formed by adding a metal salt to a solvent, such that the metal catalyst precursor solution includes one or more metals dissolved in an alcohol, i.e., ethanol. The appropriate metal concentration in the metal precursor solution can be readily determined by one of ordinary skill in the art of catalyst preparation. For example, concentration of the precursor solutions can be up to the solubility limitations of the preparation technique with consideration given to such parameters as porosity of the support, number of impregnation steps and pH of the precursor solutions.

In some embodiments, the metal precursor solution can include metals selected from nickel, magnesium, cobalt, gold, strontium, palladium, platinum, ruthenium, rhodium, osmium, iridium, silver, copper, iron, chromium, lead, vanadium, tungsten, or combinations thereof. In some embodiments, the metal precursor solution can include metals of at least one Group X metal, of at least one Group IX metal, of at least one alkaline earth metal or combinations thereof. For example, the metal precursor solution can include magnesium, cobalt, and nickel.

In some embodiments, the one or more metals added to the metal precursor solution can include easily decomposable forms of the metal, i.e., nickel, in a sufficiently high enough concentration to permit convenient preparation. Examples of easily decomposable metal forms include, but are not limited to, nitrate, amine, and oxalate salts of the metal catalyst component. Additional non-limiting examples of metal precursors include acetates and hydroxides of the metal catalyst component. In some embodiments, the metal precursor solution can include nitrates of magnesium, cobalt, and nickel. In some embodiments, the metal precursor solution can include nitrates, acetates, or hydroxides of magnesium, cobalt and nickel or combinations thereof.

The process to generate the $CO_2$ reforming supported catalyst can also include mixing and then heating the catalyst solution at a temperature in the range of 40° C. to 150° C. for a period in the range of 5 to 48 hours to form a solid catalyst mass. For example, heating the catalyst solution can be at a temperature in the range of 40° C. to 120° C., 40° C. to 100° C., 40° C. to 80° C., 50° C. to 150° C., 50° C. to 120° C., 50° C. to 90° C., 60° C. to 150° C., 60° C. to 120° C., 60° C. to 90° C. Heating the catalyst solution can be also for a period of 5 to 30 hours, 5 to 24 hours, 5 to 18 hours, 5 to 10 hours, 12 to 48 hours, 12 to 30 hours, 12 to 24 hours, 12 to 18 hours, 18 to 48 hours, 18 to 30 hours, or 18 to 24 hours.

In some embodiments, the catalyst solution generated by the combination of the precursor metal solution and the support solution can be dried in air to form a solid catalyst mass 103. In some embodiments, the temperature at which the wet catalyst is dried is 50° C. to 90° C. In some embodiments, the time period during which the wet catalyst is dried to form a solid catalyst mass can be 1 to 48 hours, 6 to 48 hours, 12 to 48 hours, 24 to 48 hours, 1 to 24 hours, 6 to 24 hours, or 12 to 24 hours. In some embodiments, the wet catalyst can be dried at 90° C. for 12 hours, followed by additional drying at 50° C. for 6 to 24 hours.

In preferred embodiments, the invention is characterized by the $CO_2$ reforming supported catalyst comprising a mesoporous catalyst support and oxides of nickel (Ni), cobalt (Co) and magnesium (Mg). In some embodiments, formation of the $CO_2$ reforming supported catalyst as described above, wherein salts comprising nickel, cobalt, and magnesium are dissolved and added to the support solution, results in a mixed oxide catalyst component of the formula $NiCoMgO_x$, for example a mixed metal oxide catalyst component of the formula $Ni_aCo_bMg_cO_x$ wherein a, b, and c are the relative mole fraction of each metal in the mixed oxide component and total 1, wherein a and b are each independently is 0.1 to 0.3, or 0.1 to 0.25, or 0.15 to 0.25, or 0.2 to 0.25, or 0.2 to 0.3 and c is 0.3 to 0.6, or 0.3 to 0.55, or 0.35 to 0.5 or 0.4 to 0.5 or 0.45 to 0.5, or 0.4 to 0.6, and x has a value effective to form the mixed metal oxide. In an embodiment, a and b are each independently 0.22 to 0.33 and c is 0.44 to 0.56.

An advantage of the $CO_2$ reforming supported catalyst is that a $H_2$:CO molar ratio in the syngas can be obtained which is higher than 0.9.

Another advantage of the $CO_2$ reforming supported catalyst is that a thermal stable catalyst composition is obtained which is active for a long time.

A further advantage of the $CO_2$ reforming supported catalyst is that the dispersion of the active metals in the catalyst composition is high.

The $CO_2$ reforming supported catalyst comprises a mesoporous catalyst support. A mesoporous catalyst support is defined as a catalyst support containing pores with diameters between 2 and 50 nm. Porous materials are classified into several classes by their pore diameter. According to IUPAC notation, microporous materials have pore diameters of less than 2 nm and macroporous materials have pore diameters of greater than 50 nm; the mesoporous category thus lies in the middle. The advantage of using a mesoporous catalyst support is that in such a support the dispersion of the metals that are present in the catalyst composition is high; resulting in a high catalyst activity. Further, the use of a mesoporous support prevents the metals in the catalyst from sintering. Typical mesoporous materials include silica and/or alumina. Further examples are mesoporous oxides of niobium, tantalum, titanium, zirconium, cerium, and tin. The mesoporous material can be disordered or ordered in a mesostructure. A procedure for producing mesoporous materials is, for instance, described in U.S. Pat. No. 3,493,341. The mesoporous catalyst support preferably comprises alumina, more preferably alumina and silica.

Further, when the $CO_2$ reforming supported catalyst comprises oxides of nickel (Ni), cobalt (Co) and magnesium (Mg), the amount of nickel in the catalyst composition preferably is higher than 0.01 mol % relative to the catalyst composition; more preferably higher than 0.05 mol %, most preferably higher than 0.1 mol %. The amount of nickel in the catalyst composition preferably is lower than 2 mol % relative to the catalyst composition; more preferably is lower than 1 mol % and most preferably is lower than 0.7 mol %.

The amount of cobalt in the catalyst composition preferably is higher than 0.01 mol % relative to the catalyst composition; more preferably higher than 0.05 mol %, most preferably higher than 0.1%. The amount of cobalt in the $CO_2$ reforming supported catalyst preferably is lower than 2 mol % relative to the $CO_2$ reforming supported catalyst; more preferably is lower than 1 mol % and most preferably is lower than 0.7 mol %.

Preferably, the molar ratio between the amounts of nickel and cobalt in the $CO_2$ reforming supported catalyst is 5:1 to 1:5, preferably 3:1 to 1:3, more preferably 2:1 to 1:2.

The amount of magnesium in the $CO_2$ reforming supported catalyst preferably is higher than 0.05 mol % relative to the $CO_2$ reforming supported catalyst; more preferably higher than 0.1 mol %, most preferably higher than 0.3 mol %. The amount of magnesium in the $CO_2$ reforming supported catalyst preferably is lower than 2.5 mol % relative to the $CO_2$ reforming supported catalyst; more preferably is lower than 1.5 mol % and most preferably is lower than 1.2 mol %.

The $CO_2$ reforming supported catalyst can, optionally, also contain small amounts of promoters. Examples of promoters are lanthanum (La) or cerium (Ce). The amount of promoter that can be used is preferably higher than 0.001 mol % relative to the $CO_2$ reforming supported catalyst; more preferably higher than 0.002 mol %, most preferably higher than 0.003%. The amount of promoter in the $CO_2$ reforming supported catalyst preferably is lower than 0.5 mol % relative to the $CO_2$ reforming supported catalyst; more preferably is lower than 0.3 mol % and most preferably is lower than 0.2 mol %.

The process to generate the $CO_2$ reforming supported catalyst can further include a calcination step after formation of the solid catalyst mass 104. The calcination step can be performed in air, oxygen, an inert gas, or combinations thereof. Non-limiting examples of an inert gas include, but are not limited to, nitrogen and helium. The solid catalyst mass can be ground to a powder catalyst, preferably a fine powder catalysts, and calcined at a temperature from 300° C. to 1000° C., 400° C. to 1000° C., 500° C. to 1000° C., 600° C. to 900° C., and maintained at the calcining temperature for a period of time sufficient to effect calcination of the material. In some embodiments, the duration of the calcining step can range from 2 hours to 40 hours, 2 hours to 30 hours, 2 hours to 20 hours, 4 hours to 40 hours, 4 hours to 20 hours, 4 hours to 8 hours, depending, in part, upon the calcining temperature. In some embodiments, the solid catalyst mass can be calcined in air at a temperature in the range of 600° C. to 900° C. for a period in the range of 4 to 8 hours. For example, the catalyst can be calcined at 600° C. for 4 hours under static air, followed by additional calcination at 900° C. for 4 hours.

In some embodiments, the process for generating the $CO_2$ reforming supported catalyst can further include reducing the $CO_2$ reforming supported catalyst by subjecting the catalyst to a gas stream 105. Catalysts that are in an oxidized state can be reduced prior to their use in hydrocarbon conversion reactions. In some embodiments, the gas stream can include gases selected from, but not limited to, hydrogen, nitrogen, air, steam, or combinations thereof. In some embodiments, the gas stream contains hydrogen. In one embodiment, the gas stream contains hydrogen and air. In some embodiments, the catalyst can be reduced in a gas stream for a period in the range of 0.5 to 4 hours. For example, the $CO_2$ reforming supported catalyst can be reduced in a gas stream, which includes hydrogen, for 0.5 to 2.0 hours. In some embodiments, the catalyst can be reduced in a gas stream, which includes hydrogen and nitrogen at a ratio of 1:1, for 0.5 to 2.0 hours at a temperature of 750° C. to 850° C.

In some embodiments, a process for the production of the $CO_2$ reforming supported catalyst includes impregnating a mesoporous catalyst support with a solution comprising salts of Ni, Co and Mg, followed by drying and calcining at a temperature above 500° C.

In some embodiments, the $CO_2$ reforming supported catalyst can be prepared by adding a solution comprising salts of Ni, Co and Mg to a solution comprising a salt of at least one element from the group consisting of aluminium, silicon, niobium, tantalum, titanium, zirconium, cerium and tin, and a micelle-forming polymer, followed by mixing, heating, drying and calcining at a temperature above 500° C.

During the production of the $CO_2$ reforming supported catalyst, oxides of the elements will be formed that will together form the mesoporous support. During the preparation of the catalyst composition the solution preferably comprises a salt of aluminium.

The mesoporous catalyst support comprises alumina, preferably alumina and silica.

The salts of Ni, Co, Mg, and Al can be chosen from, for example, nitrates, oxides, chlorides or mixtures a combination comprising at least one of the foregoing. A solution of the salts can be formed in water or in an organic solvent, for example an alcohol. Examples of alcohols are primary alcohols, for example methanol and ethanol.

Micelles are polymers (surfactants) that arrange themselves in a spherical form in a polar solution. A micelle-forming surfactant can be classified according to their polar head group. A non-ionic surfactant has no charge groups in its head. The head of an ionic surfactant carries a net charge. If the charge is negative, the surfactant is more specifically called anionic; if the charge is positive, it is called cationic. If a surfactant contains a head with two oppositely charged groups, it is termed zwitterionic. Anionic surfactants contain anionic functional groups at their head, such as sulfate, sulfonate, phosphate, and carboxylate. Alkyl sulfates include ammonium lauryl sulfate, sodium lauryl sulfate, sodium dodecyl sulfate (SDS) and the related alkyl-ether sulfates; sodium laureth sulfate, also known as sodium lauryl ether sulfate (SLES), and sodium myreth sulfate. Carboxylates are the most common surfactants and comprise the alkyl carboxylates (soaps), such as sodium stearate. More specialized species include sodium lauroyl sarcosinate and carboxylate-based fluorosurfactants such as perfluorononanoate, perfluorooctanoate (PFOA or PFO). Examples of cationic surfactants are primary, secondary, or tertiary amines, cetyl trimethylammonium bromide (CTAB) a.k.a. hexadecyl trimethyl ammonium bromide, cetyl trimethylammonium chloride (CTAC), cetylpyridinium chloride (CPC), benzalkonium chloride (BAC), benzethonium chloride (BZT), 5-bromo-5-nitro-1,3-dioxane, dimethyldioctadecylammonium chloride and dioctadecyldimethylammonium bromide (DODAB). Zwitterionic surfactants have both cationic and anionic centers attached to the same molecule. The cationic part is based on primary, secondary, or tertiary amines or quaternary ammonium cations. The anionic part can be more variable and include sulfonates, as in 3-[(3-cholamidopropyl)dimethylammonio]-1 to propanesulfonate (CHAPS). Other anionic groups are sultaines, betaines, and phosphates. As non-ionic surfactants can be mentioned fatty alcohols, polyoxyethylene glycol alkyl ethers, polyoxypropylene glycol alkyl ethers, glucoside alkyl ethers, polyoxyethylene glycol octylphenol ethers (e.g. Triton® X-100), polyoxyethylene glycol alkylphenol ethers, glycero alkyl esters, polyoxyethylene glycol sorbitan alkyl esters, sorbitan alkyl esters, cocamide MEA, cocamide DEA, dodecyldimethylamine oxide, block copolymers of polyethylene glycol and polypropylene glycol (Pluronic®) and polyethoxylated tallow amine (POEA).

Preferably, a non-ionic surfactant is used as the micelle-forming polymer, more preferably the micelle-forming polymer is a block copolymer of polyethylene glycol and polypropylene glycol, most preferably the micelle-forming polymer is Pluronic® P123.

The process of forming a mesoporous $CO_2$ reforming supported catalyst by using a micelle-forming polymer as a template is also known as template assisted crystallization.

The impregnation of the mesoporous catalyst support with the metal salt solution can be performed by impregnation or diffusion. The impregnation is preferably performed by incipient wetness impregnation (IW or IWI), also called capillary impregnation or dry impregnation. This is a commonly used technique for the synthesis of heterogeneous catalysts. The metal salt solution is added to a mesoporous catalyst support containing the same pore volume as the volume of the solution that was added. Capillary action draws the solution into the pores. Solution added in excess of the support pore volume causes the solution transport to change from a capillary action process to a diffusion process, which is much slower. The obtained $CO_2$ reforming supported catalyst can thereafter be dried and calcined to drive off the volatile components within the solution and depositing the metal on the support surface.

Drying is normally performed at room temperature (20° C.) to a slightly elevated temperature with a maximum of 75° C., preferably a maximum of 50° C. Calcining can be performed at a temperature above 500° C., preferably at a temperature above 750° C. The temperature during calcining preferably is lower than 1200° C., more preferably lower than 1000° C. Calcining can be performed in one stage at one temperature or at two stages at two different temperatures. When calcining is performed in two stages the first heating temperature is preferably lower than the second heating temperature. Calcining is performed for at least one hour, preferably for at least 2 hours, more preferably for at least 4 hours. Preferably, calcining is performed by first heating at a temperature between 500 and 750° C. for at least 2 hours, followed by heating at a temperature between 750 and 2000° C., preferably between 750 and 1500° C. for at least 2 hours.

Mixing is, for example, performed by vigorous stirring. Heating is performed at a temperature between 25 and 150° C., preferably between 25 and 110° C. Optionally, grinding is used to transform the solid catalyst composition into a fine powder. A grinding machine can be used for this purpose.

The present disclosure also provides a use of the $CO_2$ reforming supported catalyst, in particular, a method for producing a hydrogen-rich gas, such as syngas, using the disclosed catalysts. Syngas, or synthesis gas, is a gaseous mixture consisting of hydrogen and carbon monoxide, which can also contain other gas components. In some embodiments, the syngas produced using the $CO_2$ reforming supported catalyst can also include carbon dioxide, water, methane and nitrogen, as well as unreacted feedstock, such as methane and/or carbon dioxide.

In some embodiments, the process for producing syngas includes subjecting a feedstream of gaseous lower alkanes to carbon dioxide, oxygen, or water vapor in the presence of the $CO_2$ reforming supported catalyst. In some embodiments, the feedstream of gaseous lower alkanes contains methane.

Reaction Formulas 1, 2 and 3 below, show the dry reforming reaction, steam reforming reaction and partial oxidation of methane, wherein carbon dioxide, water vapor, or oxygen, respectively, reacts with methane to form hydrogen and carbon monoxide, i.e., syngas. In some embodiments, methane and carbon dioxide, as represented by Reaction Formula 1, can be converted into syngas by the dry reforming reaction using the $CO_2$ reforming supported catalyst. In some embodiments, methane can also be converted into syngas in the presence of water vapor by the steam reforming reaction, as represented by Reaction Formula 2, using the $CO_2$ reforming supported catalyst. In some embodiments, methane and oxygen, as represented by Reaction Formula 3, can be converted into syngas by the partial oxidation reaction using the $CO_2$ reforming supported catalyst.

$$CH_4 + CO_2 \rightarrow 2H_2 + 2CO \quad \Delta H_R = 247.3 \text{ kJ/mol} \qquad \text{[Reaction Formula 1]}$$

$$CH_4 + H_2O \rightarrow 3H_2 + CO \quad \Delta H_R = 206.0 \text{ kJ/mol} \qquad \text{[Reaction Formula 2]}$$

$$CH_4 + 0.5O_2 \rightarrow CO + 2H_2 \quad \Delta H_R = -22.2 \text{ kJ/mol} \qquad \text{[Reaction Formula 3]}$$

Suitable conditions for operating a steam reforming reactor, partial oxidation reactor and a dry reforming reactor are disclosed in V. R. Choudhary et al., in Catalysis Letters (1995) vol. 32, pp. 387-390; S. S. Bharadwaj & L. D. Schmidt in Fuel Process. Technol. (1995), vol. 42, pp. 109-127; Enger et al. in Applied Catalysis A: General (2008), vol. 346, pp. 1 to 27; Ashcroft et al. in Nature (1991), vol. 352, pp. 225-226; and Y. H. Hu & E. Ruckenstein, in Catalysis Reviews—Science and Engineering (2002), vol. 44(3), pp. 423-453, each of which is incorporated herein by reference in its entirety. In some embodiments, the dry reforming reaction, partial oxidation reaction and steam reforming reaction can be performed at a temperature range of 650° C. to 900° C. For example, the temperature of the reforming reaction can be from 750° C. to 900° C. In some embodiments, the temperature of the reforming reaction is performed at 850° C.

In some embodiments, a feedstream containing methane and carbon dioxide can be converted by catalytic dry reforming into syngas by contacting the feedstream with the $CO_2$ reforming supported catalyst at a reaction temperature of 650° C. to 900° C. to produce syngas. In some embodiments, the feedstream contains carbon dioxide and methane in a carbon dioxide/methane mole ratio of 1.1 or of 1.0. In some embodiments, the feedstream can be passed continuously over the $CO_2$ reforming supported catalyst at a gas hourly space velocity (GHSV; measured at 0° C. and 1 atmospheric pressure) of 20,000 $cm^3$/gh at a temperature of 850° C.

In some embodiments, the syngas produced by the carbon dioxide reforming of methane using the $CO_2$ reforming supported catalyst has a hydrogen-to-carbon monoxide ratio from 0.90 to 1.0, from 0.91 to 1.0, from 0.92 to 1.0, from 0.93 to 1.0, from 0.94 to 1.0, from 0.95 to 1.0, from 0.96 to 1.0, from 0.97 to 1.0, from 0.98 to 1.0 or from 0.99 to 1.0. In some embodiments, the syngas produced by the carbon dioxide reforming of methane using the $CO_2$ reforming supported catalyst has a hydrogen-to-carbon monoxide ratio of from 0.95 to 1.0.

In some embodiments, the $CO_2$ reforming supported catalyst is used in a process for the production of a syngas. Syngas can be produced starting from methane, carbon dioxide, and/or water. There are several known processes for the production of syngas. For example, methane steam reforming (MSR) process, the Auto thermal reforming (ATR) of methane or heavy hydrocarbons and the catalytic carbon dioxide reforming of methane (CRM).

When using the $CO_2$ reforming supported catalyst, preferably, the process for the production of syngas is catalytic carbon dioxide reforming of methane (CRM). During the catalytic carbon dioxide reforming the temperature preferably is between 500 and 1000° C., more preferably between 750 and 850° C.; the pressure is 1 to 5 bar, preferably 1 bar; the gas hourly space velocity is preferably between 1000 to 50,000 $cm^3 g^{-1} h^{-1}$, more preferably between 5000 and 50,000 $cm^3 g^{-1} h^{-1}$, most preferably between 10,000 $cm^3 g^{-1} h^{-1}$ and 30,000 $cm^3 g^{-1} h^{-1}$.

During the syngas production process a gas mixture is obtained with a high $H_2/CO$ molar ratio. Preferably, a $H_2/CO$ molar ratio between 0.85 and 1.00 is obtained, more preferably a $H_2/CO$ molar ratio in the syngas is obtained which is higher than 0.9.

The $CO_2$ reforming supported catalyst provides a high conversion of methane to syngas. Preferably, the conversion of methane is above 70 mol %, preferably above 80 mol %.

EXAMPLES

The following examples are merely illustrative of the presently disclosed subject matter and should not be considered as limitations in any way.

Example 1: Preparation of $CO_2$ Reforming Supported Catalyst

A mesoporous alumina-silica $CO_2$ reforming supported catalyst containing cobalt, nickel, and magnesium was synthesized using a template assisted method. The total amount of catalyst synthesized, including the alumina-silica support, was approximately 2.5 grams.

To begin synthesis of the $CO_2$ reforming supported catalyst, approximately 4 grams of PLURONIC® P123, a tri-block polymer manufactured by BASF Corp., was dissolved in ethanol at room temperature, followed by addition of 8.5 grams of aluminium isopropoxide ($Al(OPri)_3$), and vigorous stirring. Subsequently, 0.25 ml of tetraethyl orthosilicate (TEOS), a silica source, was added to the solution dropwise while continuously stirring to create a support material solution.

A metal precursor solution was made separately by dissolving metal nitrates in approximately 40 ml of primary alcohol, followed by addition of 6 ml of concentrated nitric acid ($HNO_3$). The metal precursor solution was added to the support material solution under vigorous stirring. The mixture was stirred for an additional 2 hours to create slurry, which was transferred into a polypropylene bottle and heated in an oven for 12 hours at 90° C. The temperature of the polypropylene bottle was reduced to 50° C. and was uncapped overnight to permit the remaining ethanol to evaporate. The obtained solid sample was ground to a fine powder and calcinated at 600° C. for 4 hours under static air, followed by additional calcining at 900° C. for 4 hours.

This catalyst generation process resulted in a catalyst containing cobalt, magnesium, and nickel in the Ni:Co:Mg mole ratio of 1.004:1:2.063. The resultant mesoporous alumina-silica support contained an alumina:silica mole ratio of 1:0.05.

Cross-polarization magic angle spinning (CP-MAS) nuclear magnetic resonance (NMR) was performed to determine the structure of the alumina-silica support. By CP-MAS NMR, incorporation of silica within the alumina network was observed. Brunauer-Emmett-Teller (BET) analysis was performed to measure the surface area of the $CO_2$ reforming supported catalyst, and Barret-Joyner-Halenda (BJH) analysis was performed to determine the pore volume of the catalyst. The BET surface area of the catalyst, recorded after calcination at 900° C., was determined to be 150 $m^2/g$, the crystal size was determined to be 9 nm and the average pore volume was determined to be 126 Å.

Example 2: Carbon Dioxide Reforming of Methane

Carbon dioxide reforming of methane to form syngas was performed with the $CO_2$ reforming supported catalyst of Example 1. Prior to the reaction, approximately 0.3 g of catalyst was reduced in situ by an equal mixture of hydrogen and nitrogen for 1 hour at 800° C.

The reaction was carried out at atmospheric pressure by passing a gaseous feed containing pure methane and carbon dioxide ($CO_2/CH_4$ mole ratio=1.1) continuously over the $CO_2$ reforming supported catalyst packed in a quartz tubular reactor (internal diameter=9 mm), provided with a thermocouple in the catalyst bed, at a GHSV (gas hourly space velocity, measured at 0° C., and 1 atmospheric pressure) of 20,000 $cm^3g^{-1}h^{-1}$ and a temperature of 850° C.

After attaining the reaction steady state, the reaction products were analyzed by a gas chromatograph with a thermal conductivity detector using a HP plot column. The results are shown in Table 1 below. As indicated in Table 1, the catalyst exhibited a high selectivity for methane and carbon dioxide and produced syngas with a $H_2/CO$ ratio close to 1 compared to a cobalt-nickel-magnesium catalyst on a silica-free mesoporous alumina support. These results indicate that the incorporation of silica into the mesoporous alumina cage suppressed the water gas shift reaction ($CO_2 + H_2 \rightarrow CO + H_2O$).

The amount of carbon deposited on the $CO_2$ reforming supported catalyst during the reaction was determined by oxidizing it to $CO_2$ in a flow of air (60 $cm^3$/min) for a period of 1 h at 700° C. The amount of $CO_2$ produced was then quantitatively measured by absorbing it in a barium hydroxide solution to form barium carbonate, which was then estimated gravimetrically. The $CO_2$ reforming supported catalyst was also tested for 12 hours of time on stream (TOS) to determine the stability of the catalyst's activity. The catalyst exhibited stable activity and exhibited resistance to carbon formation resulting in long-term activity with minimal to no carbon formation.

TABLE 1

Carbon dioxide reforming of methane to form syngas-conversion and selectivity results

| Catalyst | $CH_4$ conversion | $CO_2$ conversion | $H_2$ selectivity | $H_2/CO$ |
|---|---|---|---|---|
| CoNiMg on mesoporous alumina-silica support (Example 1) | 96% | 91% | 97% | 0.95-0.96 |
| CoNiMg on mesoporous Alumina support (without silica) | 90.5% | 88.5% | 97.4% | 0.90-0.91 |

Comparative Examples 3-11

$CO_2$ Reforming Supported Catalyst Preparation by Impregnation

A supported catalyst was prepared by depositing mixed nitrates of Co, Ni, and/or Mg from their aqueous solution on catalyst carrier using an incipient wetness impregnating technique. A catalyst support according to Table 2 was used. Each catalyst support was treated with an aqueous solution comprising 0.36 mol % of Co, and, where appropriate, 0.36 mol % of Ni and, where appropriate 0.74 mol % of Mg, followed by drying and calcining in air first at 600° C. for 4 h and thereafter at 900° C. for 4 h. The mole percentages of the metals were relative to the catalyst composition.

Catalysts 12-14
Mesoporous Alumina-Supported Catalyst Preparation by Template Assisted Crystallization A mesoporous alumina containing Co, Ni, Mg was synthesized using a template assisted crystallization. A promoter such as Lanthanum (La) or Cerium (Ce) was optionally added. In a typical synthesis 4 gram of Pluronic® P123 was dissolved in ethanol under stirring at room temperature, before 8.5 g of aluminium isopropoxide $[Al(OPri)_3]$ was added to the solution. Metal precursor solution was made separately by dissolving metal nitrates in primary alcohol and conc. $HNO_3$. The amounts of the nitrates of Co, Ni, or Mg were respectively 0.36 mol %, 0.36 mol % and 0.74 mol % relative to alumina ($Al_2O_3$). The latter solution was added to the Pluronic® P123 solution under vigorous stirring. The mixture was stirred further for 2 h. The final slurry was transferred into a polypropylene bottle and heated in an oven for 12 h at 90° C. The temperature of the polypropylene bottle was brought down to 50° C. and the bottle was uncapped overnight to permit the remaining ethanol to evaporate. The obtained solid sample was ground to a fine powder with a particle size between 250 and 500 micron and calcined first at 600° C. for 4 h under static air and then 900° C. for 4 h. For the synthesis of the catalysts according to catalyst examples 13 and 14, the same procedure was followed using a different alcohol medium.

Study of $CO_2$ Reforming of Methane to Syngas Reaction

The $CO_2$ reforming reaction over the catalysts was carried out at atmospheric pressure by passing continuously, a gaseous feed containing pure methane and carbon dioxide ($CO_2/CH_4$ mole ratio=1.1) over the catalyst (0.3 g) packed in a quartz tubular reactor (internal diameter=9 mm), provided with a thermocouple in the catalyst bed, at a GHSV (gas hourly space velocity, measured at 0° C., and 1 atm pressure) of 20,000 $cm^3g^{-1}h^{-1}$ and a temperature of 850° C. After attaining the reaction steady state, the reaction products were analyzed by a gas chromatograph with thermal conductivity detector using a HP plot column. The carbon deposited on the catalyst during the reaction was determined by oxidizing it to $CO_2$ in a flow of air (60 $cm^3$/min) for a period of 1 h at 700° C. and measuring quantitatively the amount of $CO_2$ produced by absorbing it in barium hydroxide solution forming barium carbonate, which was then estimated gravimetrically. Reduction of the catalysts was performed at 800° C. for 1 h in presence of 50:50 $N_2$:$H_2$ before starting the reaction.

The results of the $CO_2$ reforming of methane to syngas are given in Table 2. The results in Table 2 show that the carbon deposition on the catalysts 12, 13 and 14 is very low compared to the carbon deposition on the catalysts 6, 7 and 8 of the comparative experiments. Further the use of the catalyst compositions 12, 13 and 14 led to a high conversion of feed gases to syngas and a $H_2/CO$ molar ratio in the syngas is obtained which is higher than 0.9.

Figure 2:
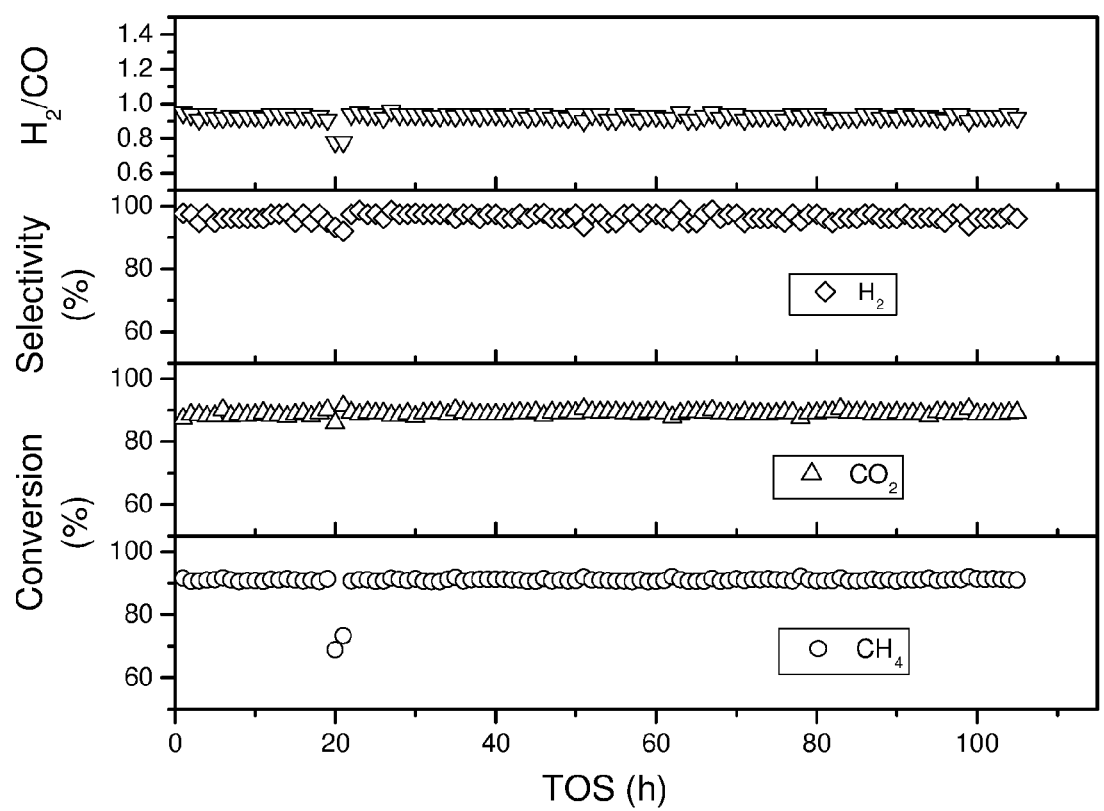
FIG. 2 illustrates thermal stability for $CO_2$ reforming supported catalyst 12.
Figure 3:
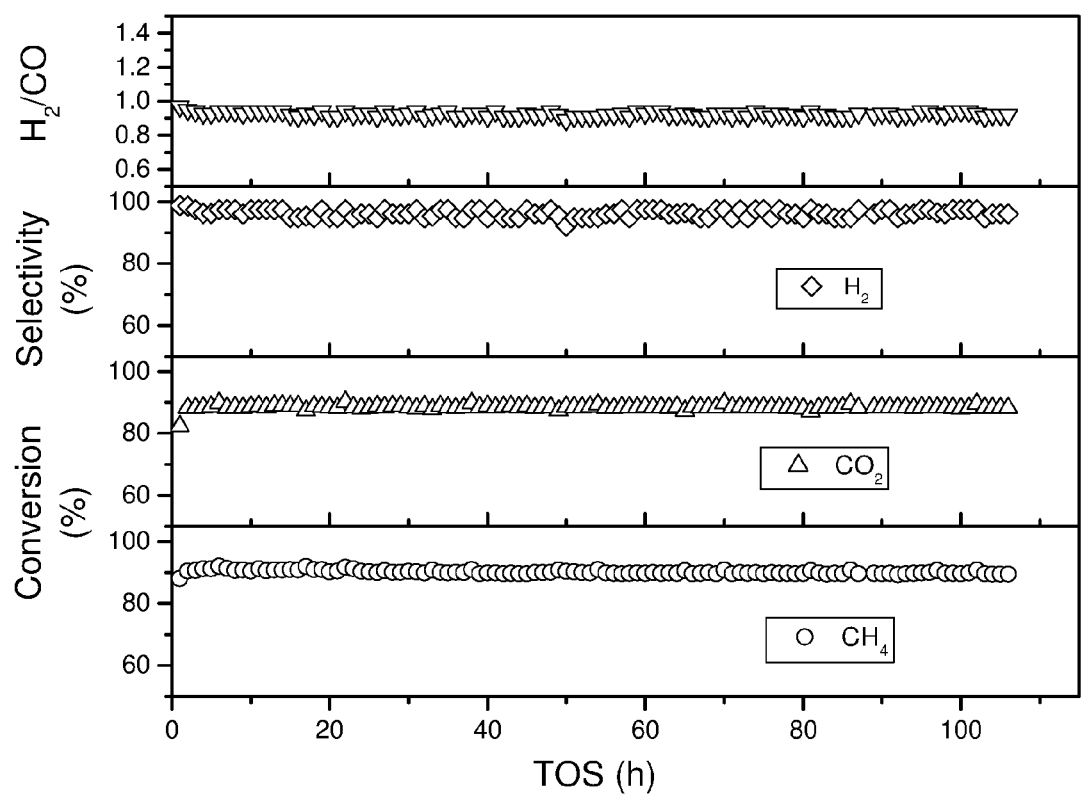
FIG. 3 shows thermal stability for $CO_2$ reforming supported catalyst 13.

The stability of catalyst 12 and 13 was tested for more than 100 hours. The results of these tests are shown in FIGS. 2 and 3. FIGS. 2 and 3 shows that catalysts 12 and 13 are thermally stable for more than 100 hours time-on-stream (TOS).

Table 3 illustrates textural properties such as BET surface area, pore volume, BJH pore volume, and carbon deposition of the catalysts according to catalyst examples 12-14.

Table 4 shows the effect of the promoters La and Ce that are present in various amounts in catalyst number 12. The same reaction conditions as for the results of Table 2 are used. By using the promoters the $CH_4$ conversion and the $CO_2$ conversion can be enhanced over the $CH_4$ conversion and the $CO_2$ conversion of catalyst number 12 without promoter.

Study of $CO_2$ Reforming of Methane to Syngas Reaction in Presence of Steam

TABLE 2

Comparison of catalyst performance in $CO_2$ reforming of methane to syngas over supported catalysts

| | | | After 1 hr of TOS | | | | End of TOS | | | | BET | |
| --- | --- | --- | --- | --- | --- | --- | --- | --- | --- | --- | --- | --- |
| Ex | Catalyst | TOS (h) | $CH_4$ conv. (%) | $CO_2$ conv. (%) | $H_2$ sel (%) | $H_2/CO$ | $CH_4$ conv. (5) | $CO_2$ conv (%) | $H_2$ sel (%) | $H_2/CO$ | surface area ($m^2g^{-1}$) | Carbon Deposition ($g_cg_{cat}^{-1}h^{-1}$) |
| 3 | $CoMgO_x/\alpha$-$Al_2O_3$ | 4 | 1.7 | 4.5 | 100.0 | 0.49 | 1.8 | 5.1 | 100.0 | 0.47 | — | — |
| 4 | $CoNiO_x/\alpha$-$Al_2O_3$ | 9 | 86.7 | 86.2 | 100.0 | 0.94 | 83.8 | 85.2 | 92.9 | 0.86 | — | — |
| 5 | $CoNiO_x/MgO_x/$ $\alpha$-$Al_2O_3$ | 9 | 81.7 | 84.6 | 94.3 | 0.88 | 79.7 | 83.7 | 94.1 | 0.87 | — | — |
| 6 | $CoNiMgO_x/\alpha$-$Al_2O_3$ | 9 | 84.7 | 86.7 | 97.2 | 0.91 | 86.2 | 87.1 | 97.3 | 0.91 | 11.2 | $4 \times 10^{-3}$ |
| 7 | $CoNiMgO_x/\gamma$-$Al_2O_3$ | 8 | 88.6 | 87.1 | 97.3 | 0.92 | 90.4 | 87.8 | 97.4 | 0.93 | 80.4 | $2 \times 10^{-3}$ |
| 8 | $CoNiMgO_x/SiO_2$ | 8 | 93.5 | 89.8 | 97.5 | 0.95 | 86.2 | 86.2 | 97.3 | 0.92 | — | $1 \times 10^{-3}$ |
| 9 | $CoNiMgO_x/SiO_2$—$Al_2O_3$ | 8 | 60.4 | 68.0 | 92.2 | 0.81 | 35.8 | 50.1 | 73.8 | 0.58 | — | |
| 10 | $CoNiMgO_x/ZrO_2$ | 8 | 93.2 | 89.9 | 98.0 | 0.95 | 80.0 | 82.5 | 88.5 | 0.83 | — | $3 \times 10^{-3}$ |
| 11 | $CoNiMgO_x$ | 7 | 56.2 | 67.0 | 87.5 | 0.75 | 67.4 | 74.6 | 86.1 | 0.77 | — | — |
| 12 | $CoNiMgO_x$-MAl (Prepared by using EtOH medium) | 10 | 90.5 | 88.5 | 97.4 | 0.92 | 91.7 | 89.5 | 97.4 | 0.93 | 136.4 | $4 \times 10^{-3}$ |
| 13 | $CoNiMgO_x$-MAl (Prepared by using MeOH medium) | 7 | 91.0 | 88.3 | 97.4 | 0.94 | 93.5 | 90.2 | 96.3 | 0.93 | 36.9 | $9 \times 10^{-3}$ |
| 14 | $CoNiMgO_x$-MAl (Prepared by using Isopropanol medium) | 6 | 88.8 | 87.0 | 97.4 | 0.94 | 89.4 | 88.0 | 94.8 | 0.91 | 124.6 | $3 \times 10^{-3}$ |

TOS = time on stream;
$H_2$ sel = $H_2$ selectivity;
conv. = conversion;
MAl = mesoporous alumina

TABLE 3

Textural properties of the catalysts according to catalyst examples 12-14

| Ex. | Catalyst | BET surface area ($m^2g^{-1}$) | Pore volume ($cm^3g^{-1}$) | BJH pore diameter (nm) | Carbon deposition ($g_c g_{cat}^{-1} h^{-1}$) |
|---|---|---|---|---|---|
| 15 | Catalyst 12: CoNiMgO$_x$-MAl (Prepared by using EtOH medium) | 136.5 | 0.4096 | 9.3 | $4 \times 10^{-4}$ (105 h of TOS) |
| 16 | Catalyst 13: CoNiMgO$_x$-MAl (Prepared by using MeOH medium) | 36.9 | 0.0916 | 6.2 | $9 \times 10^{-4}$ (106 h TOS) |
| 17 | Catalyst 14: CoNiMgO$_x$-MAl (Prepared by using Isopropanol medium) | 124.6 | 0.406 | 9.8 | $3 \times 10^{-4}$ (11 h of TOS) |

MAl = mesoporous alumina;
TOS = time on stream

TABLE 4

Effect of promoters on the performance of catalyst example 12

| | | | After 1 h of TOS | | | | End of TOS | | | |
|---|---|---|---|---|---|---|---|---|---|---|
| | | | | | | | CH$_4$ | CO$_2$ | | |
| Ex. | Catalyst | Promoter | TOS (h) | CH$_4$ conv. (%) | CO$_2$ conv. (%) | H$_2$ sel (%) | H$_2$/CO | conv. (%) | conv. (%) | H$_2$ sel (%) | H$_2$/CO |
| 18 | CoNiMgO$_x$-MAl | 0.5 wt % La | 11 | 91.2 | 86.7 | 97.3 | 0.91 | 94.1 | 91.3 | 96.1 | 0.92 |
| 19 | CoNiMgO$_x$-MAl | 1 wt % La | 10 | 90.5 | 89.5 | 98.7 | 0.90 | 92.4 | 89.7 | 97.4 | 0.93 |
| 20 | CoNiMgO$_x$-MAl | 0.5 wt % Ce | 11 | 81.1 | 85.4 | 97.1 | 0.90 | 91.9 | 93.7 | 97.4 | 0.91 |
| 21 | CoNiMgO$_x$-MAl | 1 wt % Ce | 8 | 91.5 | 91.9 | 98.7 | 0.91 | 91.9 | 92.4 | 98.7 | 0.92 |

TOS = time on stream;
H2 sel = H2 selectivity;
conv. = conversion;
MAl = mesoporous alumina The CO$_2$ reforming of methane in the presence of steam over the catalyst (0.3 g) packed in a quartz tubular reactor (internal diameter=9 mm), was carried out at atmospheric pressure by passing continuously. The feed was a mixture of pure methane (>99.95%) and CO$_2$ (>99.99%), with steam. Water vapor was added to the feed using a SAGE syringe pump and a specially designed evaporator. Before carrying out the reaction, the catalyst was heated in situ at 850° C. in a flow (50 cm$^3$·min$^{-1}$) of moisture-free nitrogen for 1 h and then reduced by hydrogen (5% H$_2$ in N$_2$) at 800° C. for 1 h. The catalytic reactions were carried out at 850° C., gas hourly space velocity (GHSV) of 20,000 cm$^3$g$^{-1}$h$^{-1}$ (measured at 0° C. at 1 atm) and the relative concentrations of methane, steam, CO$_2$ in the feed were; CO$_2$/H$_2$O=0.4 and CO$_2$/CH$_4$=0.3. After carrying out the reaction for a period of 1 h, the product gases (after condensation of the water from them at 0° C.) were analyzed by online-gas chromatography with TCD, using an Hp plot Q column and He as the carrier gas. The C, H, and O balance across the reactor was within 26%. All experiments with larger errors in the material balances were rejected. The H$_2$ and CO selectivity reported are based on the methane conversion alone. Reduction of the catalysts was performed at 800° C. for 1 h in presence of 50:50 N$_2$:H$_2$ before starting the reaction.

Figure 4:
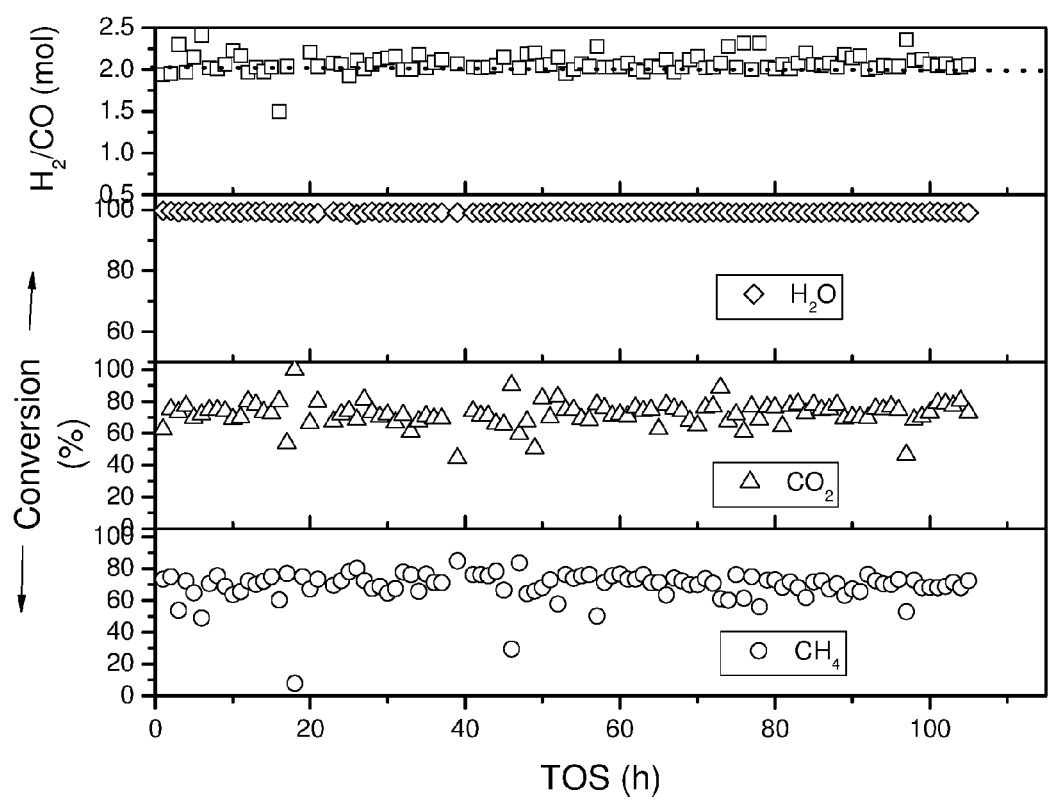
FIG. 4 illustrates stability of $CO_2$ reforming supported catalyst 12 upon testing for more than 100 hours.

The stability of CO$_2$ reforming supported catalyst 12 was tested for more than 100 hours. The result of this test is shown in FIG. 4. The structure of catalyst 12 was tested by low angle X-ray diffraction after 100 hours of reforming. This test showed that the mesoporous structure of the catalyst still existed after 100 hours of reforming time.

In summary, the present disclosure relates to improved CO$_2$ reforming supported catalyst for use in the production of syngas and methods for manufacturing and using the catalysts. The inventors hereof have discovered a CO$_2$ reforming catalyst composition, comprising oxides of cobalt, nickel, and magnesium on an alumina-silica support. In some embodiments, the CO$_2$ reforming supported catalyst includes a catalyst metal component and a porous support material. In some embodiments, the catalyst metal component can include at least one metal that is nickel, magnesium, cobalt, gold, strontium, palladium, platinum, ruthenium, rhodium, osmium, iridium, silver, copper, iron, chromium, lead, vanadium, tungsten, or a combination comprising at least one of the foregoing. For example, the catalyst metal component can contain oxides of cobalt, nickel, and magnesium. In some embodiments, the catalyst metal component can have a nickel:cobalt:magnesium mole ratio of 1:1:2.

In some embodiments, the porous support material can be selected from silica, alumina, titanium or a combination thereof. For example, the porous support material can contain alumina and silica. Further, the alumina-silica support can be mesoporous, wherein the average pore size can be 2 to 50 nm. The amount of alumina and silica contained within the porous support can vary depending on the reaction conditions under which the CO$_2$ reforming supported catalyst will operate. In some embodiments, the alumina-silica support has an alumina-to-silica mole ratio of 1:0.05.

The present disclosure also provides for methods for producing the CO$_2$ reforming supported catalyst. In some embodiments, the process for the preparation of a catalyst containing oxides of nickel, cobalt, and magnesium on a mesoporous alumina-silica support includes dissolving a triblock copolymer in ethanol, and subsequently adding aluminium isopropoxide and tetraethyl orthosilicate to form an alumina-silica solution. A metal nitrate solution including magnesium, cobalt, and nickel dissolved in alcohol can be added to the alumina-silica solution, followed by the addition of concentrated nitric acid to form a catalyst solution. Mixing and then heating the catalyst solution at a temperature in the range of 50° C. to 90° C. for a period in the range of 12 to 24 hours can form a solid catalyst mass. The catalyst solution can be dried in air at a temperature in the range of 50° C. to 90° C. for a period of 12 to 24 hours to form a solid catalyst mass. The solid catalyst mass can, in turn, be ground into a fine power and calcined in air at a temperature in the range of 600° C. to 900° C. for a period of 4 to 8 hours. The process can further include reducing the $CO_2$ reforming supported catalyst by a gaseous mixture containing hydrogen and air for 1 hour prior to its use in a chemical reaction.

The present disclosure further provides for methods using the $CO_2$ reforming supported catalyst in carbon dioxide reforming of lower alkanes, including methane, to generate syngas. The $CO_2$ reforming supported catalysts exhibit high hydrogen selectivity to produce syngas that contains hydrogen to carbon monoxide ratios that approach 1.0. In some embodiments, the process for $CO_2$ reforming of lower alkanes to synthesis gas, includes subjecting a feedstream of gaseous lower alkanes to $CO_2$ in the presence of $CO_2$ reforming supported catalyst, specifically a catalyst comprising oxides of nickel, cobalt, and magnesium on a mesoporous alumina-silica support. For example, the feedstream of gaseous lower alkanes can contain methane.

The invention is further illustrated by the following embodiments.

Embodiment 1

A $CO_2$ reforming supported catalyst, comprising oxides of cobalt, nickel, and magnesium disposed on a support comprising alumina, ceria, niobia, silica, tantalum oxide, tin oxide, titania, or a combination comprising at least one of the foregoing oxides.

Embodiment 2

A $CO_2$ reforming supported catalyst, comprising oxides of cobalt, nickel, and magnesium disposed on a support, wherein the amount of magnesium is 0.05 and 2.5 mol % relative to the supported catalyst.

Embodiment 3

The supported catalyst of embodiment 2, wherein the support comprises alumina, ceria, niobia, silica, tantalum oxide, tin oxide, titania, zirconia, or a combination comprising at least one of the foregoing oxides.

Embodiment 4

A $CO_2$ reforming supported catalyst, comprising a mixed metal oxide catalyst component of the formula $NiCoMgO_x$ disposed on a support.

Embodiment 5

The supported catalyst of embodiment 4, wherein the support comprises alumina, ceria, niobia, silica, tantalum oxide, tin oxide, titania, zirconia, or a combination comprising at least one of the foregoing oxides.

Embodiment 6

The supported catalyst of any one or more of embodiments 1 to 5, wherein the support has an average pore diameter of 5 to 13 nm.

Embodiment 7

The supported catalyst of any one or more of embodiments 1 to 6, wherein the supported catalyst has an average pore volume from 0.06 $cm^3/g$ to 0.5 $cm^3/g$.

Embodiment 8

The supported catalyst of any one or more of embodiments 1 to 7, wherein the support is an alumina-silica support.

Embodiment 9

The supported catalyst of any one or more of embodiments 1 to 4, wherein no zirconia is present.

Embodiment 10

The supported catalyst of any one or more of embodiments 1 to 9, wherein the catalyst exhibits hydrogen selectivity equal to or greater than 97% in $CO_2$ reforming.

Embodiment 11

The supported catalyst of any one or more of embodiments 1 to 10, wherein the catalyst provides equal to or greater than 96% methane conversion in $CO_2$ reforming.

Embodiment 12

The supported catalyst of any one or more of embodiments 1 to 11, wherein the catalyst provides in equal to or greater than 91% carbon dioxide conversion in $CO_2$ reforming.

Embodiment 13

A process for the preparation of the $CO_2$ reforming supported catalyst of any one or more of embodiments 1 to 12, the process comprising: combining a templating copolymer and a support precursor in a solvent to form a support solution, wherein the support precursor comprises an aluminum compound, silicon compound, titanium compound, or a combination comprising at least one of the foregoing salts; dissolving salts comprising nickel, cobalt, and magnesium in a solvent to form a metal solution; combining the support solution and the metal solution; adding an acid to form a catalyst solution; heating the catalyst solution at a temperature effective to form a solid catalyst mass; grinding the solid catalyst mass into a powdered catalyst; and calcining the powdered catalyst in the presence of oxygen to provide the $CO_2$ reforming supported catalyst.

Embodiment 14

The process of embodiment 13, wherein the process further comprises subjecting the calcined, supported catalyst to a gas stream that comprises hydrogen to reduce the $CO_2$ reforming supported catalyst.

Embodiment 15

The process of embodiment 13 or 14, wherein the support solution comprises an aluminum compound and a silica compound.

Embodiment 16

The process of any one or more of embodiments 13 to 15, wherein no zirconium compound is present.

Embodiment 17

A process for the preparation of the $CO_2$ reforming supported catalyst of any one or more of embodiments 1 to 12, the process comprising: providing a support comprising alumina, ceria, niobia, silica, tantalum oxide, tin oxide, titania, or a combination comprising at least one of the foregoing oxides; and impregnating the support with a solution comprising salts of nickel, cobalt and magnesium; drying the impregnated support; and calcining the impregnated, dried support at a temperature above 500° C.

Embodiment 18

The process of embodiment 17, wherein the process further comprises subjecting the calcined, supported catalyst to a gas stream that comprises hydrogen to reduce the $CO_2$ reforming supported catalyst.

Embodiment 19

The process of embodiment 17 or 18, wherein the support solution comprises alumina-silica.

Embodiment 20

The process of any one or more of embodiments 17 to 19, wherein no zirconium oxide is present in the $CO_2$ reforming supported catalyst.

Embodiment 21

A process for $CO_2$ reforming of lower alkanes to a synthesis gas comprising $H_2$ and CO, the process comprising subjecting a feedstream of gaseous lower alkanes to $CO_2$ in the presence of the catalyst of any one or more of embodiments 1 to 20 at a temperature and pressure effective to reform the $CO_2$.

Embodiment 22

The process of embodiment 21, wherein the feedstream of gaseous lower alkanes comprises methane.

Embodiment 23

The process of embodiment 21 or 22, wherein the feedstream comprises a carbon dioxide:methane mole ratio of 1.1.

Embodiment 24

The process of any one or more of embodiments 21 to 23, wherein the synthesis gas comprises a $H_2$:CO ratio from 0.95 to 1.0.

Embodiment 25

Use of a catalyst composition according to any one or more of embodiment 1 to 24 in a process for the production of a syngas.

In another aspect, the invention is still further illustrated by the following embodiments.

Embodiment 26

Catalyst composition for reforming $CO_2$ comprising a mesoporous catalyst support and oxides of nickel (Ni), cobalt (Co) and magnesium (Mg), for example a mixed metal oxide of the formula $NiCoMgO_x$, for example a mixed metal oxide of the formula wherein $Ni_aCo_bMg_cO_x$ wherein a, b, and c are the relative mole fraction of each metal in the mixed oxide component and total 1, wherein a and b are each independently 0.1 to 0.3, or 0.1 to 0.25, or 0.15 to 0.25, or 0.2 to 0.25, or 0.2 to 0.3, and c is 0.3 to 0.6, or 0.3 to 0.55, or 0.35 to 0.5 or 0.4 to 0.5 or 0.45 to 0.5, or 0.4 to 0.6, and x has a value effective to form the mixed metal oxide, preferably wherein, a and b are each independently 0.22 to 0.33 and c is 0.44 to 0.56.

Embodiment 27

Catalyst composition according to embodiment 26, wherein the catalyst support comprises alumina.

Embodiment 28

Catalyst composition according to embodiments 26 or 27, wherein the amount of Ni is between 0.01 and 2 mol % relative to the catalyst composition.

Embodiment 29

Catalyst composition according to any one or more of embodiments 26 to 28, wherein the amount of Co is between 0.01 and 2 mol % relative to the catalyst composition.

Embodiment 30

Catalyst composition according to any one or more of embodiments 26 to 29, wherein the amount of Mg is between 0.05 and 2.5 mol % relative to the catalyst composition.

Embodiment 31

Catalyst composition according to any one or more of embodiments 26 to 30, wherein lanthanum (La) and/or cerium (Ce) are present in an amount lower than 0.5 mol %.

Embodiment 32

Process for the production of a catalyst composition according to any one or more of embodiments 26 to 31, wherein a solution comprising salts of Ni, Co and Mg is added to a solution comprising) a salt of at least one of aluminum, silicon, niobium, tantalum, titanium, zirconium, cerium and tin, and a micelle-forming polymer, followed by mixing, heating, drying and calcining at a temperature above 500° C.

Embodiment 33

Process according to embodiment 32, wherein the micelle-forming polymer is a poly(ethylene glycol)-poly(propylene glycol)-poly(ethylene glycol) copolymer, preferably Pluronic® P123.

Embodiment 34

Process according to embodiment 32 or 33, wherein the solution comprises a salt of aluminum.

Embodiment 35

Process according to any one or more of embodiments 32 to 34, wherein the calcining is performed by first heating at a temperature of 500 to 750° C. for at least 2 hours, followed by heating at a temperature of 750 to 2000° C. for at least 2 hours.

Embodiment 36

Use of a catalyst composition according to any one or more of embodiments 26 to 35 in a process for the production of a syngas.

Embodiment 37

Use of a catalyst composition according to embodiment 36, wherein the process for the production of a syngas is catalytic carbon dioxide reforming of methane (CRM).

Embodiment 38

Use of a catalyst composition according to embodiment 36 or 37, wherein the gas hourly space velocity is between 1000 to 50,000 $cm^3 g^{-1} h^{-1}$ at a temperature between 500 and 1000° C.

Embodiment 39

Use according to any one or more of embodiments 36 to 38, wherein a gas mixture is obtained with a $H_2$:CO molar ratio between 0.85 and 1.00.

Embodiment 40

Use according to any one or more of embodiments 36 to 39, wherein the conversion of methane is above 70 mol %.

The values described herein are inclusive of an acceptable error range for the particular value as determined by one of ordinary skill in the art, which will depend in part on how the value is measured or determined, i.e., the limitations of the measurement system.

The singular forms "a," "an," and "the" include plural referents unless the context clearly dictates otherwise. "Or" means "and/or." Unless defined otherwise, technical and scientific terms used herein have the same meaning as is commonly understood by one of skill in the art to which this invention belongs. A "combination" is inclusive of blends, mixtures, alloys, reaction products, and the like.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

All cited patents, patent applications, and other references are incorporated herein by reference in their entirety.

While the disclosed subject matter is described herein in terms of some embodiments and representative examples, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein and not in other embodiments, it should be apparent that individual features of one embodiment can be combined with one or more features of another embodiment or features from a plurality of embodiments.

The invention claimed is:

1. A $CO_2$ reforming supported catalyst, comprising oxides of cobalt, nickel, and magnesium disposed on a support comprising alumina, niobia, silica, tantalum oxide, tin oxide, titania, or a combination comprising at least one of the foregoing oxides; and a promoter, wherein the promoter is lanthanum or cerium, wherein the amount of the promoter is from more than 0.001 to less than 0.5 mol % relative to the supported catalyst.

2. The supported catalyst claim 1, wherein the support has an average pore diameter of 5 to 13 nm.

3. The supported catalyst of claim 1, wherein the supported catalyst has an average pore volume from 0.06 $cm^3/g$ to 0.5 $cm^3/g$.

4. The supported catalyst of claim 1, wherein the support is an alumina-silica support.

5. The supported catalyst of claim 1, wherein no zirconia is present.

6. The supported catalyst of claim 1, wherein the catalyst exhibits hydrogen selectivity equal to or greater than 97% in $CO_2$ reforming.

7. The supported catalyst of claim 1, wherein the catalyst provides equal to or greater than 96% methane conversion in $CO_2$ reforming.

8. The supported catalyst of claim 1, wherein the catalyst provides in equal to or greater than 91% carbon dioxide conversion in $CO_2$ reforming.

9. A process for the preparation of the $CO_2$ reforming supported catalyst of claim 1, the process comprising:
    combining a templating copolymer and a support precursor in a solvent to form a support solution;
    dissolving salts comprising nickel, cobalt, and magnesium in a solvent to form a metal solution;
    combining the support solution and the metal solution;
    adding a promoter, wherein the promoter is lanthanum or cerium;
    adding an acid to form a catalyst solution;
    heating the catalyst solution at a temperature effective to form a solid catalyst mass;
    grinding the solid catalyst mass into a powdered catalyst; and
    calcining the powdered catalyst in the presence of oxygen to provide the $CO_2$ reforming supported catalyst.

10. The process of claim 9, wherein the process further comprises subjecting the calcined, supported catalyst to a gas stream that comprises hydrogen to reduce the $CO_2$ reforming supported catalyst.

11. The process of claim 9, wherein the support solution comprises an aluminum compound and a silica compound.

12. The process of claim 9, wherein no zirconium compound is present.

13. A process for $CO_2$ reforming of lower alkanes to a synthesis gas comprising $H_2$ and CO, the process comprising subjecting a feedstream of gaseous lower alkanes to $CO_2$ in the presence of the catalyst of claim 1 at a temperature and pressure effective to reform the $CO_2$.

14. The process of claim 13, wherein the feedstream of gaseous lower alkanes comprises methane.

15. The process of claim 13, wherein the feedstream comprises a carbon dioxide:methane mole ratio of 1.1.

16. The process of claim 13, wherein the synthesis gas comprises a $H_2$:CO ratio from 0.95 to 1.0.

17. A $CO_2$ reforming supported catalyst, comprising oxides of cobalt, nickel, and magnesium disposed on a support, wherein the amount of magnesium is between 0.05 and 2.5 mol % relative to the supported catalyst and a promoter, wherein the promoter is lanthanum or cerium, wherein the amount of the promoter is from more than 0.001 to less than 0.5 mol % relative to the supported catalyst.

18. The supported catalyst of claim 17, wherein the support comprises alumina, niobia, silica, tantalum oxide, tin oxide, titania, zirconia, or a combination comprising at least one of the foregoing oxides.

19. A process for the preparation of the $CO_2$ reforming supported catalyst of claim 18, the process comprising:
providing a support comprising alumina, niobia, silica, tantalum oxide, tin oxide, titania, zirconia, or a combination comprising at least one of the foregoing oxides; and
impregnating the support with a solution comprising salts of nickel, cobalt, and magnesium;
adding a promoter, wherein the promoter is lanthanum or cerium;
drying the impregnated support; and
calcining the impregnated, dried support at a temperature above 500° C.

20. The process of claim 19, wherein the process further comprises subjecting the calcined, supported catalyst to a gas stream that comprises hydrogen to reduce the $CO_2$ reforming supported catalyst.

21. The process of claim 19, wherein the support comprises alumina-silica.

22. The process of claim 19, wherein no zirconia is present in the support.

23. A $CO_2$ reforming supported catalyst, comprising a mixed metal oxide catalyst component of the formula $NiCoMgO_x$ disposed on a support; and a promoter, wherein the promoter is lanthanum or cerium, wherein the amount of the promoter is from more than 0.001 to less than 0.5 mol % relative to the supported catalyst.

24. The supported catalyst of claim 23, wherein the support comprises alumina, niobia, silica, tantalum oxide, tin oxide, titania, zirconia, or a combination comprising at least one of the foregoing oxides.

* * * * *